US009674428B2

United States Patent
Kapinos et al.

(10) Patent No.: US 9,674,428 B2
(45) Date of Patent: Jun. 6, 2017

(54) DETERMINATION OF AT LEAST ONE PARAMETER FOR PRODUCING IMAGES FOR USE BY AN APPLICATION

(71) Applicant: LENOVO (Singapore) Pte. Ltd., New Tech Park (SG)

(72) Inventors: Robert James Kapinos, Durham, NC (US); Edward Barney Grant, Jr., Palm Coast, FL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 100 days.

(21) Appl. No.: 14/548,609

(22) Filed: Nov. 20, 2014

(65) Prior Publication Data

US 2016/0150155 A1 May 26, 2016

(51) Int. Cl.
*H04N 5/76* (2006.01)
*H04N 5/232* (2006.01)
*G06F 17/30* (2006.01)

(52) U.S. Cl.
CPC ..... *H04N 5/23222* (2013.01); *G06F 17/3028* (2013.01); *H04N 5/23219* (2013.01)

(58) Field of Classification Search
CPC .................................................. H04N 5/23222
See application file for complete search history.

(56) References Cited

U.S. PATENT DOCUMENTS

| 5,365,293 | A | * | 11/1994 | Nakatani | F16M 11/105 |
|---|---|---|---|---|---|
| | | | | | 396/428 |
| 7,009,644 | B1 | * | 3/2006 | Sanchez | H04N 5/2173 |
| | | | | | 348/243 |
| 2004/0239792 | A1 | * | 12/2004 | Shibutani | G09G 5/00 |
| | | | | | 348/333.12 |
| 2007/0292123 | A1 | * | 12/2007 | Ueda | G03B 13/02 |
| | | | | | 396/374 |
| 2012/0026350 | A1 | * | 2/2012 | Ozone | H04N 5/232 |
| | | | | | 348/208.4 |
| 2015/0085179 | A1 | * | 3/2015 | Van Heugten | H04N 5/23212 |
| | | | | | 348/349 |

* cited by examiner

*Primary Examiner* — Gary C Vieaux
(74) *Attorney, Agent, or Firm* — John L. Rogitz; John M. Rogitz (57) ABSTRACT

In one aspect, a device includes a processor, a camera accessible to the processor, and a memory accessible to the processor. The memory bears instructions executable by the processor to command the camera to produce a first image using at least a first parameter and a second image using at least a second parameter different from the first parameter, permit access to the first image and second image by an application, and receive from the application data which indicates which of the first parameter and the second parameter to use to produce at least a third image.

20 Claims, 7 Drawing Sheets

Sensor
FIG. 6A

3x4 output
FIG. 6B

16x9 output
FIG. 6C

Sensor image
FIG. 7A

3x4 image
FIG. 7B

16x9 image
FIG. 7b

Sensor image
FIG. 8A

3x4 output
FIG. 8B

16x9 output
FIG. 8C

Sensor image
FIG. 9A

3x4 output
FIG. 9B

16x9 output
FIG. 9C

DETERMINATION OF AT LEAST ONE PARAMETER FOR PRODUCING IMAGES FOR USE BY AN APPLICATION

I. FIELD

The present application relates generally to producing images for use by applications.

II. BACKGROUND

As recognized herein, a raw picture gathered by a camera is typically altered before being provided to an application for use. However, an altered picture can and often does have an aspect ratio and resolution that is not the best for use by the application. This can lead to the application e.g. having to use a picture with a resolution that is insufficient and/or having to use a picture with an aspect ratio that undesirably eliminates part of the raw picture.

SUMMARY

Accordingly, in one aspect a device includes a processor, a camera accessible to the processor, and a memory accessible to the processor. The memory bears instructions executable by the processor to command the camera to produce a first image using at least a first parameter and a second image using at least a second parameter different from the first parameter, permit access to the first image and second image by an application, and receive from the application data which indicates which of the first parameter and the second parameter to use to produce at least a third image.

In another aspect, a method includes commanding at least one camera to produce at least a first image of at least a first type and a second image of at least a second type different from the first type, determining which of at least the first image and the second image is suitable for undertaking a function using an application based on a first characteristic identified from the first image and a second characteristic identified from the second image, and based on the determination, commanding the camera to produce at least a third image comprising one of the first characteristic and the second characteristic.

In still another aspect, a computer readable storage medium that is not a transitory signal includes instructions executable by a processor to determine at least one suitable characteristic for an image to be used by a first application, where the at least one suitable characteristic comprises at least one of a suitable aspect ratio, a suitable height, a suitable width, and a suitable resolution. The instructions are also executable to provide data to a camera application to produce at least one image that comprises the at least one suitable characteristic. The camera application is different from the first application.

The details of present principles, both as to their structure and operation, can best be understood in reference to the accompanying drawings, in which like reference numerals refer to like parts, and in which:

BRIEF DESCRIPTION OF THE DRAWINGS

FIGS. 6A-9C show example images in accordance with present principles.

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs, computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together. B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
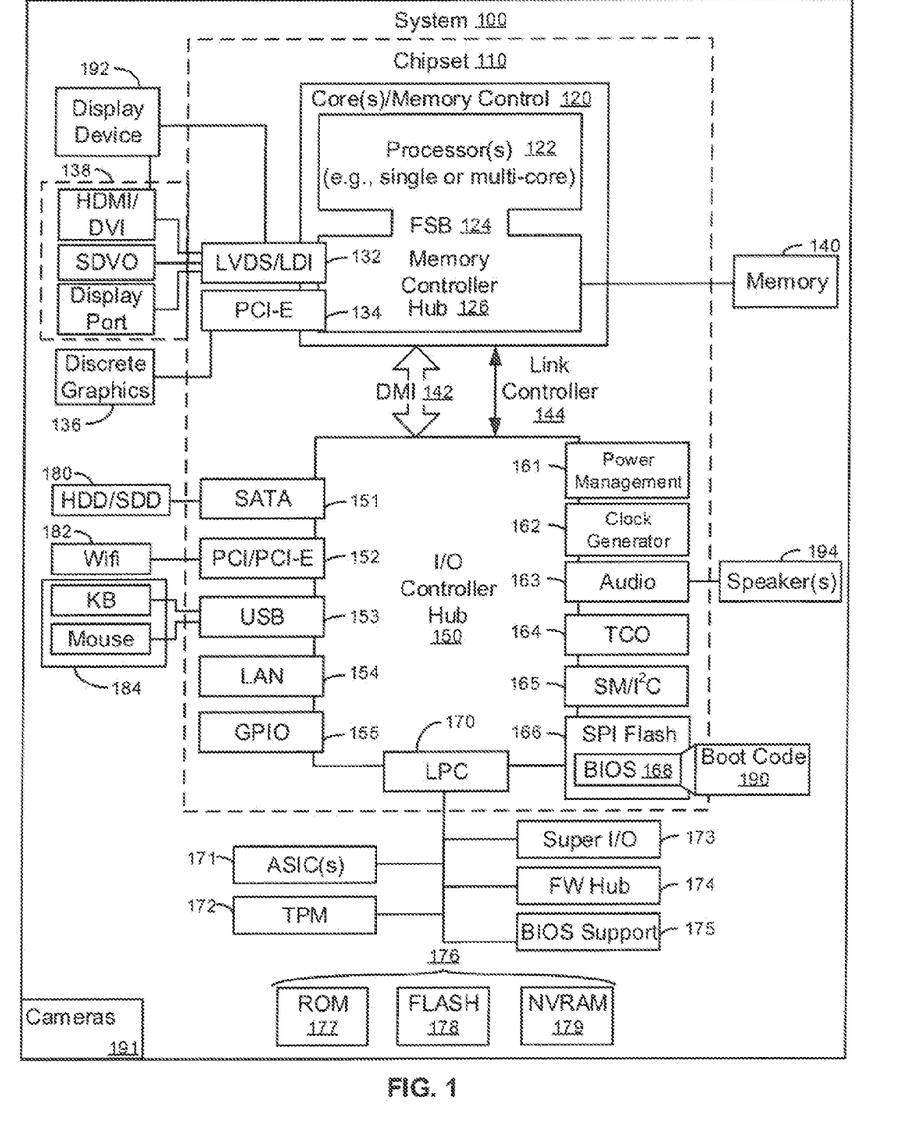
FIG. 1 is a block diagram of an example system in accordance with present principles.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 may include at least one camera 191 for gathering one or more images and providing input related thereto to the processor 122. The camera 191 may be, e.g., a thermal imaging camera, a digital camera such as a webcam, and/or a camera integrated into the system 100 and controllable by the processor 122 to gather pictures/images and/or video.

Additionally, though now shown for clarity, in some embodiments the system 100 may include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, and an audio receiver/microphone providing input to the processor 122 e.g. based on a user providing audible input to the microphone. Still further, and also not shown for clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
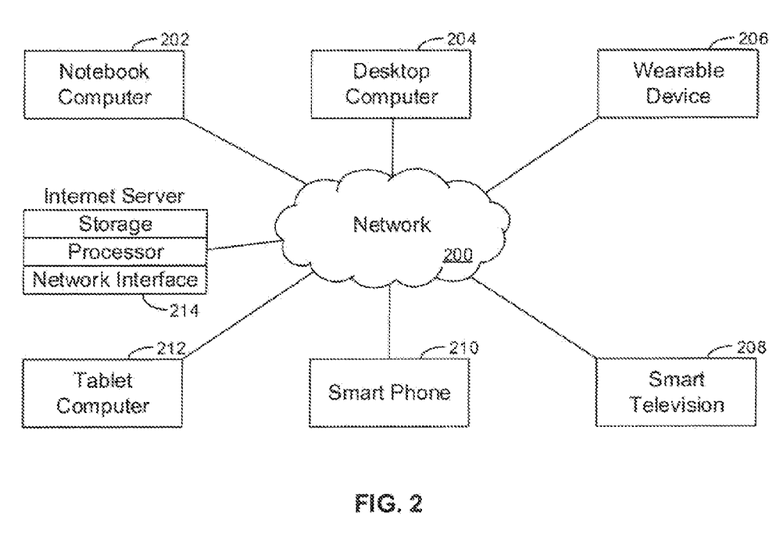
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
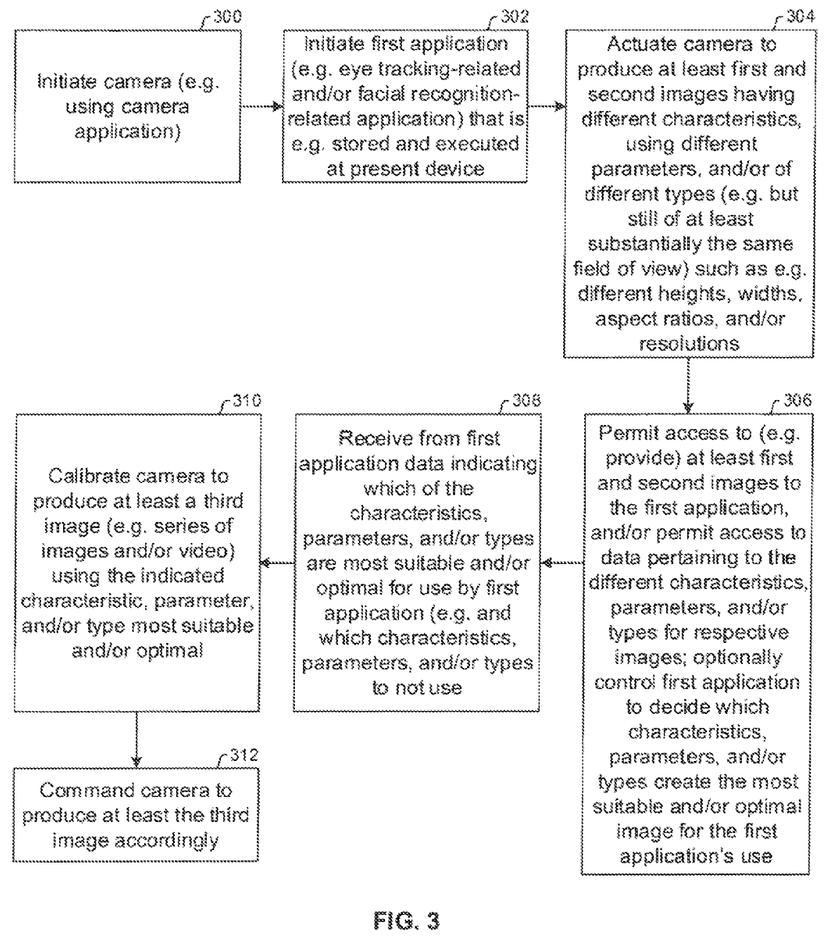
FIGS. 3-5 are flow charts showing example algorithms in accordance with present principles.

Referring to FIG. 3, it shows example logic that may be undertaken by a device such as the system 100 in accordance with present principles (referred to below as the "present device" for simplicity). Beginning at block 300, the logic initiates a camera in communication with the present device e.g. using an application (referred to below as the "camera application") for controlling the camera and gathering and/or producing at least two images gathered relatively close in time to each other so that they show e.g. at least substantially the same field of view in accordance with present principles. After block 300) the logic moves to block 302, where the logic initiates another application referred to below as a "first application." The first application may be for e.g. undertaking eye tracking-related and/or facial recognition-related functions. Furthermore, the first application may in some embodiments be e.g. stored and executed at the present device.

From block 302 the logic proceeds to block 304, where the logic commands and/or actuates the camera to gather plural images including first and second images. The first and second images may be images of different types (e.g. different resolutions), may have been produced using different parameters (e.g. different image heights and/or different image widths, and/or different aspect ratios), and/or may have different characteristics (e.g. respectively showing different parts of the same object in their respective fields of view). Notwithstanding, it is to be understood that the first and second images may still have e.g. substantially the same field of view save for e.g. content being shown or not shown toward respective borders of the images (e.g. due to different cropping of the images) owing to the images being gathered relatively close in time to each other with the camera remaining relatively immobile while gathering the first and second images.

Responsive to production of the first and second images at block 304, the logic moves to block 306, where the logic permits access to (e.g. such as by providing the images to) the first application (e.g. responsive to the first application earlier submitting a request for the first and second images, such as at block 302). Also at block 306, the logic may permit access to (e.g. provide) data pertaining to the different characteristics, parameters, and/or types of the first and second images, such as e.g. differing heights, widths, aspect ratios, and/or resolutions used to produce the first and second images. Also at block 306, in some embodiments the logic may e.g. control the first application for the first application to decide by analyzing the contents of the accessed images which characteristics, parameters, and/or types create the most suitable and/or optimal image for the first application's use.

After block 306, the logic moves to block 308 where the logic receives from the first application data which indicates which of the characteristics, parameters, and/or types for the first and second images (e.g. as determined by the first application itself and/or as determined based on the data provided by the first application at block 306) are most suitable and/or optimal for use by the first application to undertake a function such as e.g. gesture recognition or facial recognition. Also at block 308, in some embodiments data may be received from the first application that pertains to which characteristics, parameters, and/or types from the first and second images to not use to produce a third image in accordance with present principles.

Responsive to receipt of the data at block 308, the logic moves to block 310 where the logic may calibrate the camera (e.g. the camera application and/or software specifically) to produce at least a third image and optionally a series of images and/or video (e.g. altered from their base/raw form as gathered by the camera using the camera application) to conform to the most suitable and/or optimal characteristic(s), parameter(s), and/or type(s) indicated in the data received at block 308. Thereafter, the logic proceeds to block 312 where the logic commands the camera to gather at least one base/raw image and produce at least the third image therefrom according to the calibration.

Figure 4:
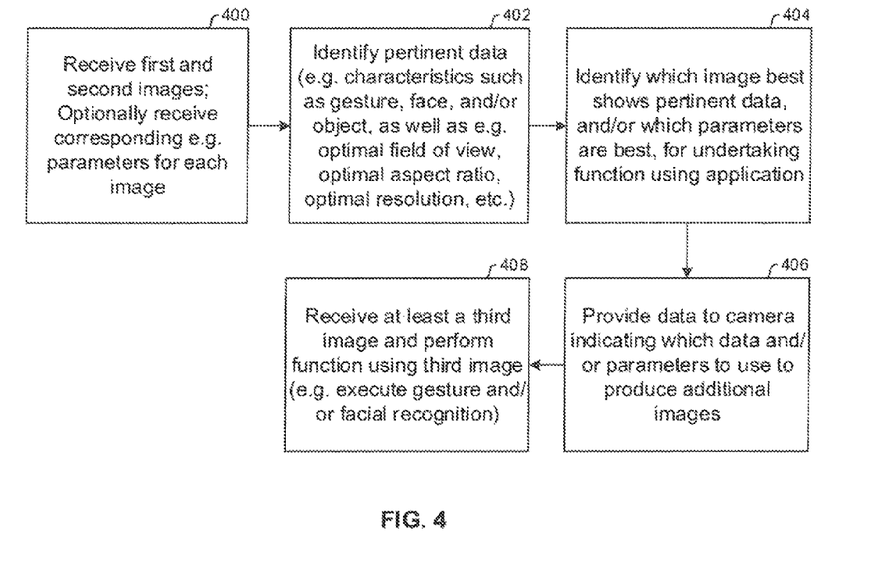

Referring to FIG. 4, it shows example logic that may be undertaken by a device such as the system 100 in accordance with present principles, and specifically by the application described in reference to FIG. 3 as the "first application."

However, it is to be understood that logic of FIG. 4 may be undertaken in conjunction with the logic of FIG. 3 and need not necessarily and exclusively be executed by the first application per se, but also e.g. undertaken at least in part using software executable by the present device's processor but not forming part of either the camera application or first application but instead interfacing therewith. In any case, the logic of FIG. 4 begins at block 400, where the logic receives first and second images and optionally their corresponding e.g. parameters in accordance with present principles, such as e.g. may have been provided at block 306 as described above. The logic then moves to block 402, where the logic identifies pertinent data in at least one of the first and second images. Pertinent data may include e.g. characteristics such as gestures, faces, and/or objects in the images themselves (e.g. which may have been identified using gesture recognition software, facial recognition software, and/or object recognition software). Pertinent data may also include optimal parameters and/or image types, such as an optimal field of view, an optimal aspect ratio, an optimal image resolution, etc. Responsive to the identification at block 402, the logic proceeds to block 404.

At block 404 the logic identifies which of the at least first and second images best comprise the pertinent data, and/or which image has the best parameters, for undertaking at least one function using the first application (e.g. such as undertaking gesture recognition). Responsive to the identification at block 404, the logic moves to block 406 where the logic provides to the camera (e.g. to the camera application) data indicating which pertinent data and/or parameters to use and/or include in future images to be produced by the camera, such as the third image described above in reference to FIG. 3. Thereafter, at block 408, the logic receives at least the third image if not a series of images conforming to the e.g. indicated parameters to thus undertake the function(s).

Figure 5:
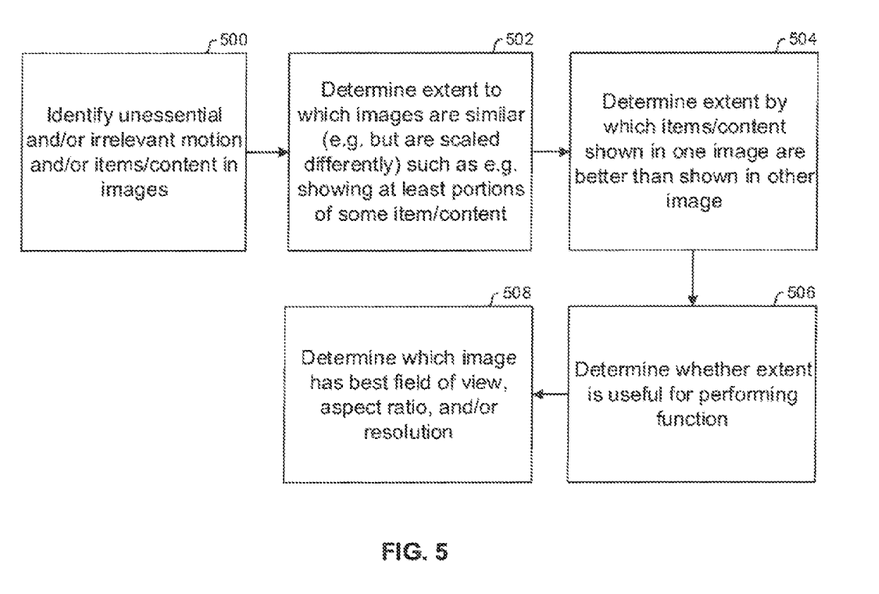

Continuing now in reference to FIG. 5, it shows example logic that may be undertaken by a device such as the system 100 in accordance with present principles, and may be executed in conjunction with FIGS. 3 and/or 4. The logic of FIG. 5 sets forth examples of the kinds of specific determinations the present device may make to determine which of plural images is the best suited and/or most optimal for undertaking a function using the first application described above.

Beginning at block 500 and after being permitted access to e.g. the first and second images described above, the logic identifies unessential and/or irrelevant e.g. motion, items and/or content in at least one of the images. For instance, should the first application be for undertaking facial recognition, inanimate objects in the images may be identified and/or determined to be areas of the images that may be ignored. As another example, should the first application be for undertaking gesture recognition, areas of the image(s) showing a user's lower torso and legs may be identified and/or determined to be areas of the image(s) that may be ignored while also identifying areas of the images showing the user's arms and hands as areas of the image that are pertinent to undertaking gesture recognition. As still another example, portions of the images may be identified as being blurred (e.g. owing to motion being present while the images were gathered) and hence unessential (e.g. since the blurred portions may not be useable for undertaking the function). As but one more example, respective different content at or near the borders of the differently produced images may be determined to be unessential e.g. owing to them not showing the face of a user even if they do show different things at their respective border owing to different aspect ratios.

After block 500 the logic moves to block 502 where the logic determines the extent to which the first and second images are similar, such as e.g. that while the images may be scaled differently, they still show at least portions of the same items and/or content, such as both showing portions of the user's face per the first example in the paragraph above or both showing portions of the user's arms and hands per the second example in the paragraph above. After block 502 the logic moves to block 504 where it determines the extent by which items and/or content shown in one of the first and second images are better shown (and/or more suitably shown) than in the other of the first and second images. For instance, it may be determined that e.g. owing to cropping during gathering and/or production of the first image, a portion of a user's hand has been cut off from view in the first image, but that in the second image the same hand is shown in full from the perspective of the camera (e.g. and taken mere milliseconds apart from the first image) due to the second image being cropped differently than the first image.

Note that the determination at block 504 alone may in some embodiments be executed but not the steps to be discussed in reference to blocks 506 and 508 below (as may the steps described in reference to blocks 506 and 508 in other embodiments) to thus cause the logic to identify at least one parameter from the image, using the example above, that when used best shows the user's hand in full. E.g., the parameter may be e.g. an image width for the image showing the hand in full and/or an image aspect ratio for that image showing the hand in full to thus configure the camera to (e.g. while at the same physical position and orientation it was in when gathering that image) gather and produce subsequent images per the identified parameter that is most suited and/or optimal for gesture recognition owing to it showing the hand in full when the image is produced.

In any case, still in reference to the example logic of FIG. 5, from block 504 the logic may proceed to block 506. At block 506 the logic determines whether the image better showing the item(s) and/or content as determined at block 504 is particularly (e.g. substantially more) useful for performing the function. For example, a first image may be determined to have a better view and/or a selectable view of a person's hand owing to it being produced as a wider image relative to a second image of the user produced using different parameters, but owing to e.g. only a portion of the user's pinky finger being cut off from view in the second image while the rest of the hand is shown in full therein, it may be determined that the first image is nonetheless not substantially better (e.g. more useful and/or otherwise necessary for performing gesture recognition) than the second image. In such an instance, other factors may be identified and/or determined by the logic from the first and second images which may make one or the other of the images more suitable and/or optimal for use for undertaking the function.

Thus, still in reference to FIG. 5, from block 506 the logic may proceed to block 508 where it may identify other factors rendering the parameters of one or the other of the produced first and second images more suitable than the other, such as e.g. one of the images having a relatively better and/or selectable field of view, aspect ratio, and/or resolution. Using the example above again where only a portion of the user's pinky finger has been cut off from one image, and assuming that this image has a relatively lower image resolution than the other image, it may be determined that despite the pinky finger being partially cut off, this difference between the images is not significant, but that using the "lower bandwidth" of this image (e.g. a smaller file size owing to the lesser resolution) may be more optimal (e.g. such as requiring less processing time, transmission time, etc.) and hence that the parameters used for gathering and/or producing the image with the pinky finger partially cut from view may be more optimal for use for undertaking gesture recognition using the first application than the parameters used to gather and/or produce the other image showing the hand in full. Accordingly, in this example, it may be appreciated that the better (and/or selectable) image resolution is not in the image with the higher resolution, but in the one with the lower resolution.

Figure 6A:
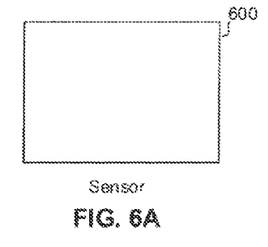
Figure 6B:
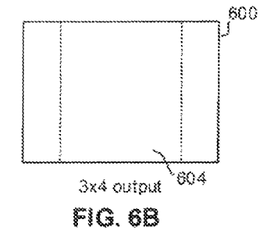
Figure 6C:
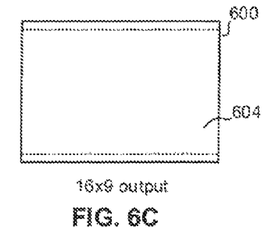

Referring now to FIG. 6A, this figure shows an example field of view of an image 600 gathered by a camera that is unaltered (e.g. not cropped by a camera application) subsequent to being gathered. E.g., the field of view shown in FIG. 6A may be the maximum field of view obtainable by the camera for a given perspective prior to being altered (e.g. cropped) by the camera application itself and made accessible to another application. FIG. 6B shows a so-called three by four aspect ratio for an image 602, with vertical portions on the left and right sides cropped out of the processed image 602 relative to the raw image 600 (e.g. that was gathered close in time prior to the image 602) as represented by the perforated lines shown thereon. FIG. 6C shows a so-called sixteen by nine aspect ratio for an image 604 with horizontal portions on upper and lower sides cropped out of the processed image 604 relative to the raw image 600 as represented by the perforated lines shown thereon.

Figure 7A:
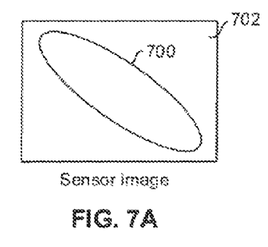
Figure 7B:
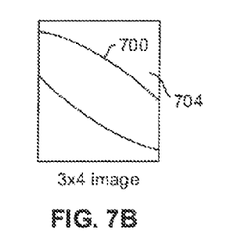

In reference to FIG. 7A, it shows an object 700 in an example field of view of an image 702 gathered by a camera that is unaltered in accordance with present principles (e.g. not cropped by the camera application and/or not had its resolution altered by the camera application subsequent to being gathered). E.g., the field of view shown in FIG. 7A may be the maximum field of view obtainable by the camera for a given perspective prior to being altered (e.g. cropped) by the camera application itself and made accessible to another application. FIG. 7B shows a first processed image 704 having a three by four aspect ratio and showing only a portion of the object 700 owing to portions of the image 702 being cropped to produce the image 704. FIG. 7C shows a second processed image 706 of a higher resolution than the image 704, with the image 706 having a sixteen by nine aspect ratio and showing the object 700 in its entirety despite the image 706 being cropped. Note that the images 704 and 706 show at least portions of the object 700 similarly owing to the respective raw images from which the images 704 and 706 were derived being gathered relatively close in time to each other.

Accordingly, should an application for undertaking a function in accordance with present principles access and/or receive both of the images 704 and 706, and determine that while the image 704 does not show the object 700 (e.g. determined to be pertinent to undertaking the function) in its entirety, it does have a desirably lower resolution and the function to be executed can be executed without an image showing the entirety of the object 700. Thus, the application may inform the camera that the parameters associated with the gathering and/or processing of the image 704 should be used for gathering and/or processing of future images of the object 700.

Figure 8A:
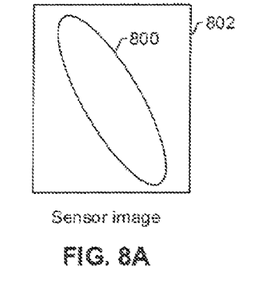
Figure 8B:
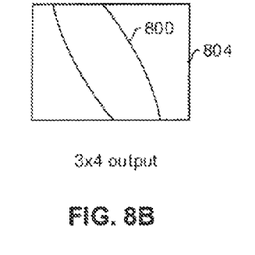
Figure 8C:
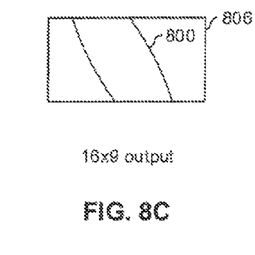

Continuing the detailed description in reference to FIG. 8, it shows an object 800 in an example field of view of an image 802 gathered by a camera that is unaltered in accordance with present principles (e.g. not cropped by the camera application subsequent to being gathered). E.g., the field of view shown in FIG. 8A may be the maximum field of view obtainable by the camera for a given perspective prior to being altered (e.g. cropped) by the camera application itself and made accessible to another application. FIG. 8B shows a first processed image 804 having a three by four aspect ratio and showing only a portion of the object 800 with the upper and lower portions being omitted owing to portions of the image 802 being cropped to produce the image 804. FIG. 8C shows a second processed image 806 having a sixteen by nine aspect ratio and showing the object 800 with even less of upper and lower portions of the object 800 being shown relative to the image 804. Note that the images 804 and 806 show at least portions of the same object 800 similarly, owing to the respective raw images from which the images 804 and 806 were derived being gathered relatively close in time to each other.

Accordingly, should an application for undertaking a function in accordance with present principles access and/or receive both of the images 804 and 806, and determine that while neither of the image 804 and 806 show the object 800 (e.g. determined to be pertinent to undertaking the function) in its entirety, both images are at least somewhat acceptable as they pertain to a horizontal dimension of the object 800, but the showing of the vertical dimension in the image 806 is worse than its showing in the image 804. Thus, the application may inform the camera that the parameters associated with the gathering and/or processing of the image 804 should be used for gathering and/or processing of future images of the object 800.

Figure 9A:
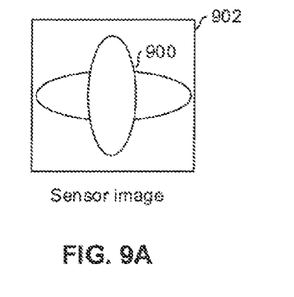
Figure 9B:
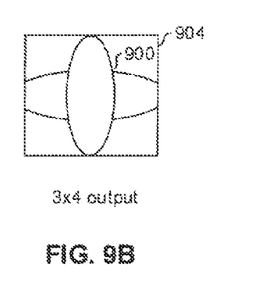
Figure 9C:
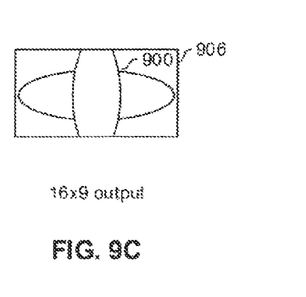

Now in reference to FIG. 9, it shows an object 900 in an example field of view of an image 902 gathered by a camera that is unaltered in accordance with present principles (e.g. not cropped by the camera application subsequent to being gathered). E.g., the field of view shown in FIG. 9A may be the maximum field of view obtainable by the camera for a given perspective prior to being altered (e.g. cropped) by the camera application itself and made accessible to another application. FIG. 9B shows a first processed image 904 having a three by four aspect ratio and showing only a portion of the object 900 with left and right portions being omitted owing to portions of the image 902 being cropped to produce the image 904. FIG. 9C shows a second processed image 906 having a sixteen by nine aspect ratio and showing only a portion of the object 900 with upper and lower portions being omitted owing to portions of the image 902 being cropped to produce the image 904. Note that the images 904 and 906 show at least portions of the same object 900 similarly, owing to the respective raw images from which the images 904 and 906 were derived being gathered relatively close in time to each other.

Accordingly, should an application for undertaking a function in accordance with present principles access and/or receive both of the images 904 and 906, and determine that while neither of the image 904 and 906 show the object 900 (e.g. determined to be pertinent to undertaking the function) in its entirety, both images are at least somewhat acceptable, with one showing the entirety of the vertical dimension of the object 900 and the other showing the entirety of the horizontal dimension of the object 900. In this case, neither image may be preferable over the other on the basis of the portions of the object 900 shown, and thus the application may determine which image format is more suitable based on other factors (e.g. differing image resolutions) and inform the camera to gather and/or process future images using the more suitable parameter(s) accordingly.

Without reference to any particular figure, it is to be understood that identification of which of plural images have characteristics that are better and/or (e.g. more) selectable than others for undertaking a function, and thus correspondingly calibrating a camera, may be executed e.g. each time a new context (e.g. a new field of view) is identified. For instance, the calibration may be performed each time a camera application is launched, each time the camera itself is actuated from off to on, each time a new object (e.g. person) is identified in a field of view, etc. As another example, a second calibration may be performed subsequent to a first calibration e.g. responsive to receipt of data from an accelerometer indicating that the device and hence camera has changed position and/or orientation (e.g. from a landscape orientation to a portrait orientation) even if e.g. data from a GPS receiver is used to determine that the device has not changed its geographic position and hence likely is directed to the same setting (e.g. at least a partial of the same field of view). However, it is to be understood that a calibration may also be performed responsive to a determination that data from the GPS receiver has been received which indicates that the device has in fact changed geographic position and hence the camera is directed to a different field of view.

It may now be appreciated that present principles provide for using computer vision analysis (e.g. facial recognition or gesture recognition) to determine which images of different e.g. formats are better than others. Images may be gathered and produced for each resolution that a given camera application is capable of using and/or for each aspect ratio that the camera is capable of using. These images may then be provided to another application (e.g. in a list) and compared by the other application to determine which image(s) is better than others (e.g. have the relatively better field of view).

Thus, in one embodiment, a device such as the system 100 can actuate a camera to take pictures relatively close in time to each other at e.g. different image resolutions, present a list of the pictures (e.g. less than a dozen) to another application, control the other application to identify that it should have a particular range for images (e.g. the X and Y axes) so that it can use them, control the other application to select which of the pictures from the list comes closest to the desired range, and then control the other application to inform the camera application to take future pictures (e.g. to calibrate the camera) using the parameters from the picture selected by the other application as coming closest to the desired range.

Examples of ways to use to identify, in a particular context, that one image is being better than another include e.g. removing and/or ignoring unessential motion from the compared images, determining that two images are similar in extent but are scaled versions of each other, determining that the pertinent content in one image exists in another image as well, determining the extent by which the content as shown in one image goes beyond how it is shown in another image (e.g. one may show all of the content relative to another image but nonetheless still not be substantially better for undertaking a particular function), determining that an image showing pertinent content only partially is nonetheless useful for undertaking the function, selecting the best image on the basis of field of view terms (e.g. total field of view) and then doing one of the other steps above by comparing the image with the best field of view against other images on the basis of e.g. image resolution and image aspect ratio, etc. In any case, it is to be understood that one or more of the examples above may lead to the application which is to undertake the function being able to identify a region of interest from the images it receives and ensure that the region of interest as best shown in one image may be processed using subsequent images to undertake a function.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave and/or a signal per se.

While the particular DETERMINATION OF AT LEAST ONE PARAMETER FOR PRODUCING IMAGES FOR USE BY AN APPLICATION is herein shown and described in detail, it is to be understood that the subject matter which is encompassed by the present application is limited only by the claims.

What is claimed is:

1. A device, comprising:
a processor;
a camera accessible to the processor; and
storage accessible to the processor and comprising instructions executable by the processor to:
command the camera to produce a first image using at least a first parameter and a second image using at least a second parameter different from the first parameter;
permit access to the first image and second image by an application analyzing contents of the first and second images comprising at least one imaged object and return, at least in part based on analyzing the at least one imaged object, one of the first parameter or the second parameter; and
command the camera to produce at least a third image using the one of the first parameter and the second parameter returned from the application.

2. The device of claim 1, wherein the instructions are executable to:
receive, from the application, data which indicates which of the first parameter and the second parameter to use to produce at least the third image, and which of at least the first parameter and the second parameter to not use to produce at least the third image.

3. The device of claim 1, wherein the instructions are executable to:
in response to the returning, perform a calibration for the camera to produce additional images using the one of the first parameter and the second parameter returned by the application.

4. The device of claim 1, wherein the application is stored and executed at the device, and wherein the instructions are executable to:
execute the application to determine which of the first parameter and the second parameter to use to produce at least the third image, wherein the determination is based at least in part on which of the first image and the second image have at least one selectable characteristic for undertaking a function using the application.

5. The device of claim 4, wherein the at least one selectable characteristic pertains to at least one selected from the group consisting of: at least one item in both the first image and the second image, a field of view.

6. The device of claim 4, wherein the at least one selectable characteristic pertains to at least one selected from the group consisting of: an aspect ratio, a resolution.

7. The device of claim 1, wherein the first parameter is not used to produce the second image and wherein the second parameter is not used to produce the first image.

8. The device of claim 1, wherein the first parameter and the second parameter are aspect ratios.

9. The device of claim 1, wherein the first parameter and the second parameter are resolutions.

10. The device of claim 1, wherein the first parameter and the second parameter pertain to one of image height and image width.

11. The device of claim 1, wherein the instructions are executable to:
permit access by the application to the first image and second image, and permit access by the application to the first parameter and the second parameter respectively associated with the first image and the second image.

12. The device of claim 1, wherein the application is a first application, and wherein the instructions are executable at least in part using a second application different from the first application, the second application useable to command the camera.

13. The device of claim 1, wherein the instructions are executable to:
receive, from the application, data which indicates which of the first parameter and the second parameter to use to produce a series of images for execution of at least one of facial recognition software and gesture recognition software on the series of images.

14. A method, comprising:
commanding at least one camera to produce at least a first image of at least a first type and a second image of at least a second type different from the first type;
determining a selected one of at least the first type and the second type to use for undertaking a function using an application based on object analysis of the first image and object analysis the second image; and
based on the determining, commanding the at least one camera to produce at least a third image of the selected one of the first type and second type;
wherein the first type and the second type pertain to a difference in one of the group consisting of: field of view, aspect ratio, height, width, and resolution.

15. The method of claim 14, wherein at least the first image and the second image are images derived from respective base images gathered by the at least one camera, the first image and the second image being altered by software.

16. The method of claim 14, comprising:
in response to the determining, performing a calibration for the at least one camera to produce additional images using the selected one of the first type and second type.

17. A computer readable storage medium that is not a transitory signal, the computer readable storage medium comprising instructions executable by a processor to:
command a camera to produce a first image using at least a first parameter and a second image using at least a second parameter different from the first parameter;
permit access to the first image and second image by an application analyzing contents of the first and second images comprising at least one imaged object and return, at least in part based on analyzing the at least one imaged object, one of the first parameter or the second parameter; and
command the camera to produce at least a third image using the one of the first parameter and the second parameter returned from the application.

18. The computer readable storage medium of claim 17, wherein the instructions are executable by the processor to:
in response to the returning, perform a calibration for the camera to produce additional images using the one of the first parameter and the second parameter returned by the application.

19. The computer readable storage medium of claim 17, wherein the first parameter and the second parameter are aspect ratios.

20. The computer readable storage medium of claim 17, wherein the first parameter and the second parameter are resolutions.

* * * * *